United States Patent [19]

Kunz et al.

[11] Patent Number: 5,251,667
[45] Date of Patent: Oct. 12, 1993

[54] THREE-WAY SOLENOID OPERATED CONTROL VALVE

[75] Inventors: Bernard L. Kunz, Madison County, Ill.; Randy L. Bomkamp, St. Louis County, Mo.

[73] Assignee: Emerson Electric Co., St. Louis, Mo.

[21] Appl. No.: 963,804

[22] Filed: Oct. 20, 1992

[51] Int. Cl.⁵ ............................................. F16K 11/14
[52] U.S. Cl. ................................. 137/607; 251/129.08
[58] Field of Search ............... 137/606, 607, 112, 113; 251/129.08, 129.04

[56] References Cited

U.S. PATENT DOCUMENTS

| 2,146,930 | 2/1939 | Bassett | 251/129.08 X |
| 2,317,717 | 4/1943 | Bauman | 137/607 X |
| 2,712,324 | 7/1955 | Lund | 137/606 |
| 3,167,091 | 1/1965 | Holdren | 137/606 X |
| 4,128,113 | 12/1978 | Hart | 137/607 X |
| 4,978,058 | 12/1990 | Duncan et al. | 251/129.08 X |
| 4,979,542 | 12/1990 | Mesenich | 137/625.65 |
| 5,083,590 | 1/1992 | Gattoliat et al. | 137/870 |

FOREIGN PATENT DOCUMENTS 2616880 10/1977 Fed. Rep. of Germany ............ 112/

*Primary Examiner*—Stephen M. Hepperle
*Attorney, Agent, or Firm*—Polster, Lieder, Woodruff & Lucchesi

[57] ABSTRACT

A three-way control valve structure for a variable fluid system including first and second valve inlet ports and a valve outlet in a ported chamber with control means to operate valve lids for the valve inlet ports to close such inlet ports in response to a preselected condition in the variable fluid system.

12 Claims, 4 Drawing Sheets

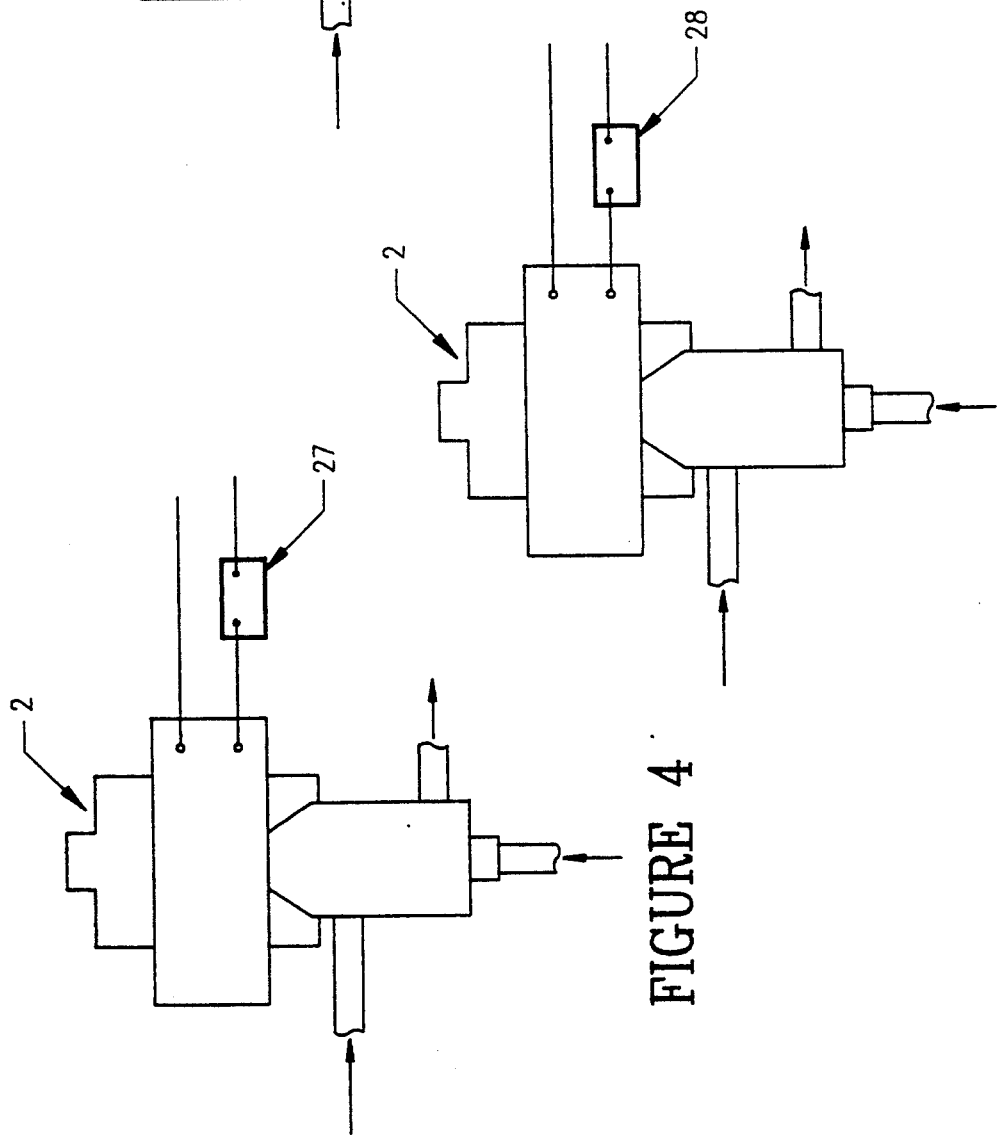

THREE-WAY SOLENOID OPERATED CONTROL VALVE

BACKGROUND OF THE INVENTION

The present invention relates to a unique valve structure and more particularly to a three-way control valve for a fluid system which is operatively responsive to a preselected fluid condition in the system to function in a selective manner.

Three-way valves in a fluid system have been generally well known in the valve art for, a long period of time, as has been the use of solenoid operated armatures to control fluid flow through ports regulated by valve seats or lids actuated by such armatures. In this regard, attention is directed to U.S. Pat. No. 4,979,542, issued to G. Mesenich on Dec. 25, 1990, which teaches such an arrangement to control fluid flow between a pressure port and a dump port through the electrical modulation of a solenoid coil. Further attention is directed to U.S. Pat. No. 5,083,590, issued to A. Gattolliat on Jan. 28, 1992, which teaches the use of a solenoid operated armature in conjunction with a three-way valve with one inlet port being normally open with the lid therefor moved to closed position by energization of the solenoid operated armature with the spring loaded lid for the other inlet port being movable independently of the solenoid operated armature under pressure in the valve chamber.

In accordance with the present invention a unique, straightforward three-way control valve structure is provided which can be economically manufactured and maintained with a minimum of parts involved to control the flow of fluid from one or both of two inlet ports to an outlet port. In addition, the present invention provides a three-way valve arrangement which insures that the two such aforedescribed inlet ports are closed in response to one of several possible preselected conditions in the fluid system. Further, in accordance with the present invention, the comparatively few valve parts involved can be light in weight, occupy a minimum of space and operate with minimal noise and energy requirements.

Various other features of the present invention will become obvious to one skilled in the art upon reading the disclosure set forth herein.

BRIEF SUMMARY OF THE INVENTION

More specifically, the present invention provides a three-way fluid valve for a variable fluid system comprising: a housing member including a ported chamber having three spaced ports, two of which serve as first and second inlet ports and the third one of which serves as an outlet port; valve lid means adjacently cooperative with each of the first and second inlet ports to control fluid flow through each of the inlet ports; and, control means for the valve lid means to selectively control fluid flow from each of the first and second inlet ports through the outlet ports, the control means being responsive to a preselected condition in the variable fluid system to insure closing of the first and second inlet ports when the preselected condition is reached.

It is to be understood that various changes can be made by one skilled in the art in one or more of the several parts of the invention disclosed herein without departing from the scope or spirit of the present invention.

BRIEF DESCRIPTION OF THE DRAWINGS

Referring to the drawings which disclose one advantageous embodiment of the present invention:

FIGS. 4–6 schematically illustrate temperature, pressure and timer mechanisms respectively for the inventive valve.

DETAILED DESCRIPTION OF THE DRAWINGS

Figure 1:
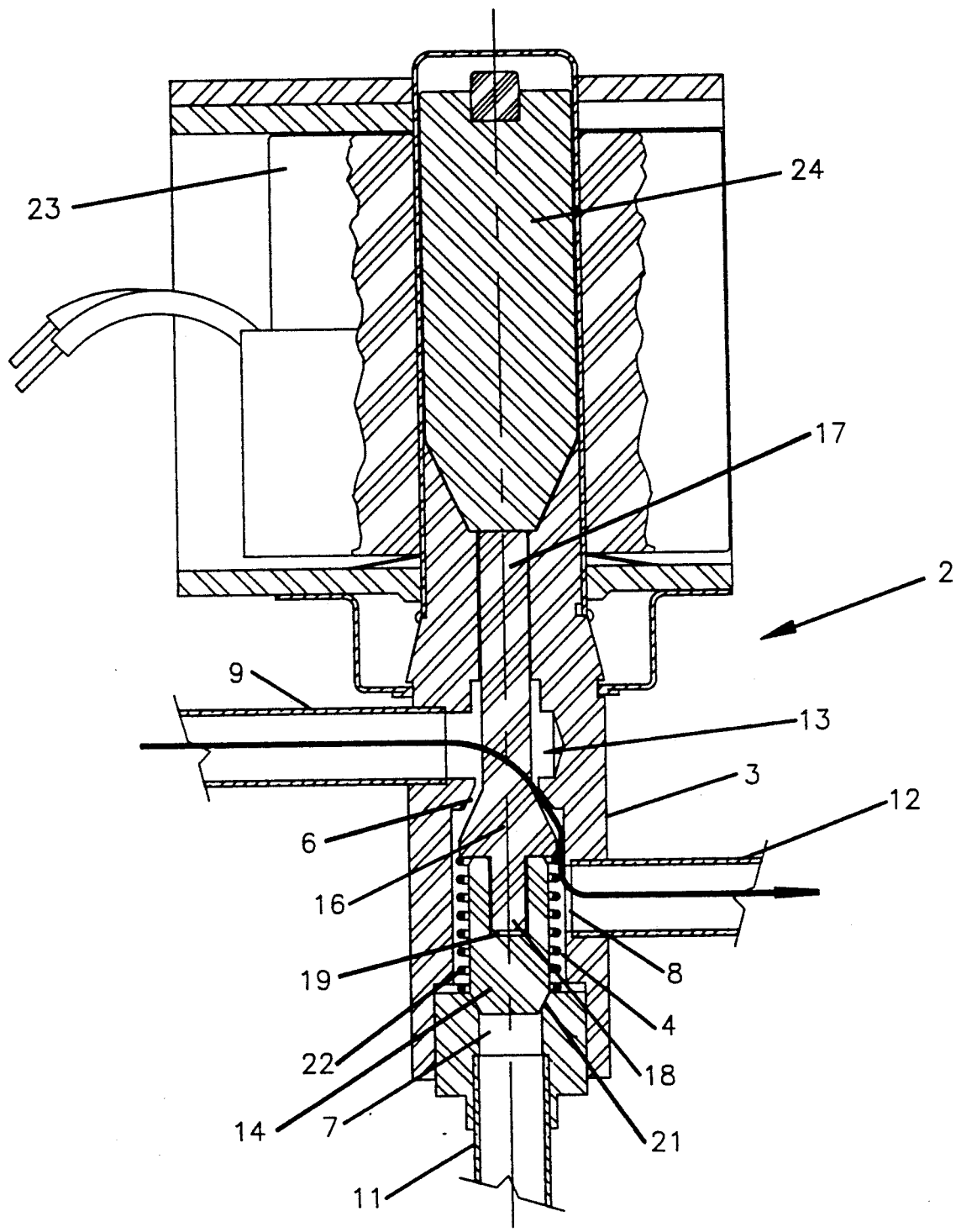
FIG. 1 discloses the inventive three-way valve for a fluid system partially in cross-section, disclosing an upper inlet port of a three ported chamber in "open" position and the lower inlet port in "closed" position with fluid flow, as indicated by the arrow, through such upper inlet port to and through an outlet port.

Referring to the drawings and particularly to FIG. 1 of such drawings, the novel three-way valve broadly referred to by reference numeral 2, includes a housing member 3, here shown in a vertical position to include a vertically extending ported chamber 4. Advantageously, housing member 3 can be formed from a suitable magnetic metal such as stainless steel or aluminum. It is to be understood that the present invention is not limited to the particular materials used for the several parts described herein, and that it would be possible to use any one of several metals or there appropriate alloys or anyone of a number of known synthetic, light, durable plastic materials. Further, the present invention is not limited to the particular vertical position and to the number of ports disclosed but could be operative in other oriented positions and with even more possible ports and armature arrangements therefor.

As disclosed, vertically extending ported chamber 4 is provided with three spaced ports 6, 7 and 8, each having a fluid conduit 9, 11 and 12 respectively connected thereto. The upper port 6 and the lower port 7 are linearly and vertically aligned in spaced opposed relation at opposite ends of vertically extending chamber 4 to serve as first upper inlet port 6 and second lower inlet port 7. The third port 8 of ported chamber 4 is arranged as a side port to extend horizontally from ported chamber 4 intermediate the upper and lower inlet ports 6 and 7 respectively, serving as outlet port 8.

Disposed within ported chamber 4 are first and second vertically aligned, linearly extending, slidably movable, upper and lower armature parts 13 and 14 respectively. Upper armature part 13 includes an integral upper valve lid 16 positioned to nest with upper inlet port 6. Armature part 13 is provided with an integral actuating arm portion 17 which vertically and movably extends upwardly above valve lip 16 in housing member 3 outside the ported chamber 4. In addition, armature part 13 is provided with an integral meshing tail portion 18 extending vertically downward within ported chamber 4 to mesh in slidable, nesting engagement with a recess 19 at the top of lower armature part 14, which armature part 14 is movably disposed within ported chamber 4 so that upper armature part 13 and lower armature part 14 are relatively moveable with respect to each other to allow independent valve lid action with respect to the ported chamber 4. In this regard, the lower armature part 14 is provided at its lower end with a valve lid 21 to engage with lower inlet port 7. It is to be noted that upper inlet port 6 and the lower inlet port 7 are each tapered inwardly in a direction away from ported chamber 4 and that upper and lower valve lids 16 and 21 respectively are compatibly tapered to nest respectively with their adjacent spaced opposed inlet ports 6 and 7.

A helically wound coil spring 22 is disposed in ported chamber 4 in surrounding relation to lower armature part 14 to engage with the lower part of upper valve lid 16 to yieldingly urge upper armature part 13 and its integral upper lid 16 into nesting "closed" position with the tapered upper port 6. A solenoid coil 23 surrounding a slidable plunger 24 to form a solenoid coil and plunger assembly which is positioned above housing member 3 remote from ported chamber 4, with plunger 24 of the assembly extending vertically to abuttingly engage the upper extremity of integral actuating arm portion 17 of upper armature part 13 which arm portion 17 extends upwardly in housing member 3, also outside ported chamber 4. When solenoid coil 23 is electrically energized, plunger 24 abuts actuating arm portion 17 of upper armature part 13 to move valve lid 16 and thus inlet port 6 to "open" position against yielding helical coil spring 22. At the same time, valve lid 21 of lower armature part 14 is moved into nesting "closed" engagement with lower inlet port 7. It is to be noted that when solenoid coil 23 is de-energized and the fluid pressure in side outlet port 8 is greater than the fluid pressure in either upper inlet port 6 or lower inlet port 7, both upper valve lid 16 and lower valve lid 21 are held in "closed" position to prevent backflow through inlet ports 6 and 7, the force of helical coil spring 22 enhancing this closed position of port 6. It further is to be noted that since solenoid coil 23 and plunger 24 are remotely positioned from ported chamber 4, ready maintenance or even removal and replacement of both the coil and plunger is possible without disturbance to ported chamber 4 and the upper and lower armature portions therein.

Figure 2:
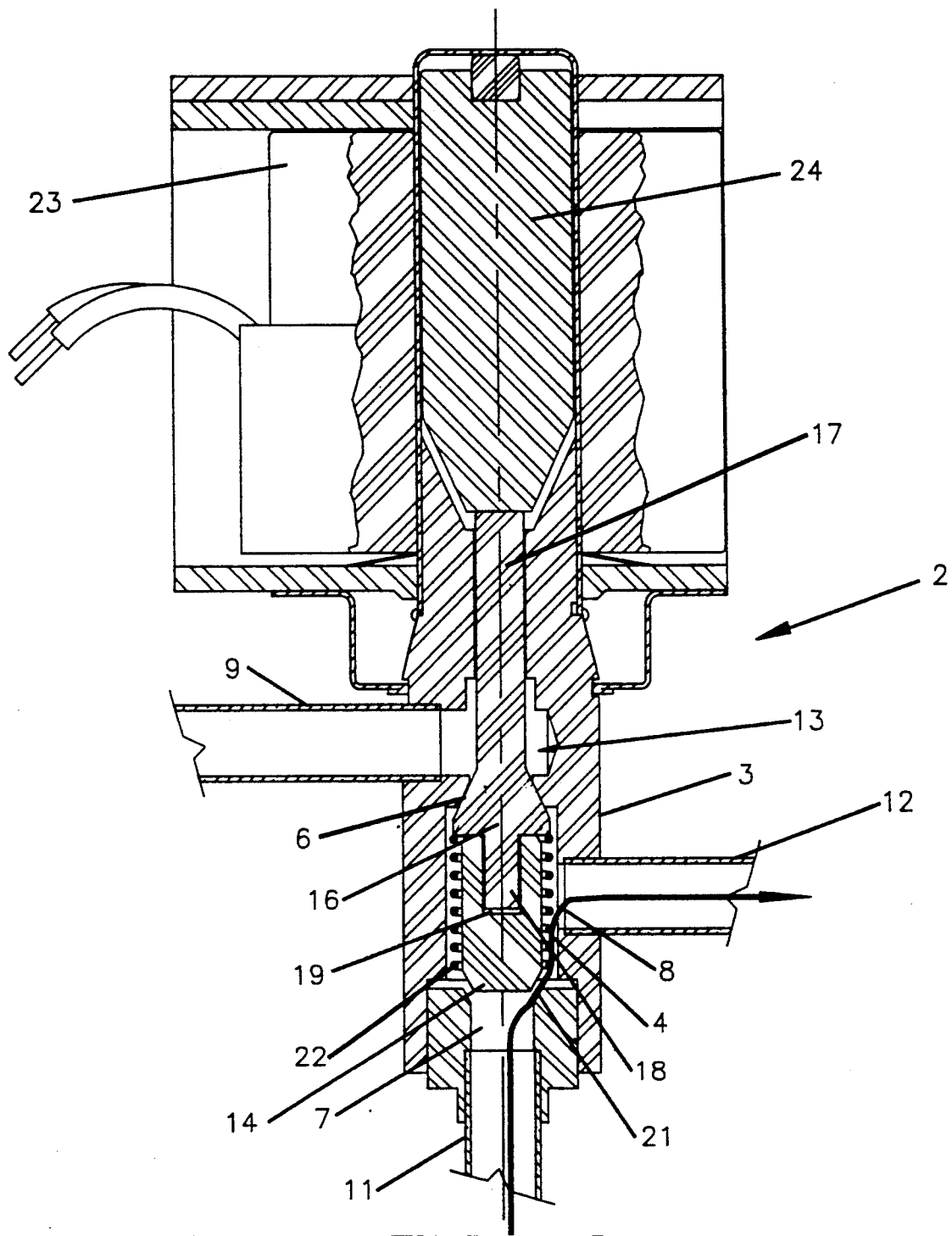
FIG. 2 discloses the three-way valve of FIG. 1, with the upper inlet port in "closed" position and the lower inlet port in "open" position with fluid flow, as indicated by the arrow, through such lower inlet port to and through the outlet port.

In a typical series of operations, referring to FIG. 1, upper port 6 can be placed in "open" position by energizing solenoid coil 23 with lower port 7 being closed by lower valve lid 21 and fluid flows from conduit 9 to conduit 12. In FIG. 2, solenoid coil 23 is de-energized and upper valve lid 16 is moved to "closed" position by the force of helical coil spring. With the fluid pressure in conduit 11 and lower port 7 in excess of the fluid pressure in side port 8, lower valve lid 21 opens and fluid flows from conduit 11 to conduit 12.

Figure 3:
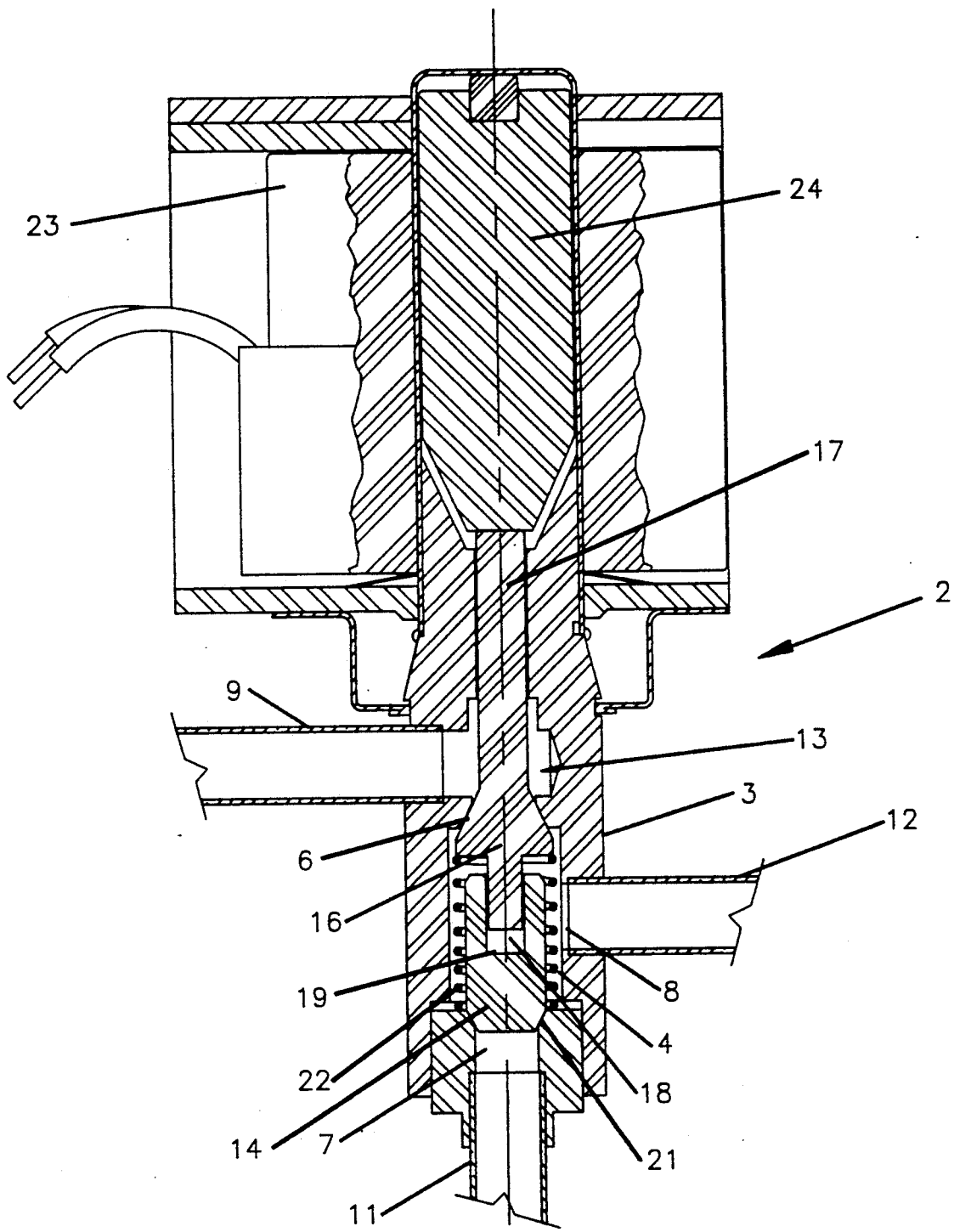
FIG. 3 discloses the three-way valve of FIGS. 1 and 2, with both upper and lower inlet ports closed and thus with no fluid flow through the inlet ports to the outlet port.

In FIG. 3, when solenoid coil 23 is de-energized and the fluid pressure at side outlet port 8 is greater than the fluid pressure at either upper inlet port 6 or lower inlet port 7, upper valve lid 16 is held in "closed" position by the force of helical coil spring 22 and the lower valve lid 21 is held in "closed" position by the fluid pressure at port 8 which is greater than the fluid pressure at lower inlet port 7. Thus, there is no fluid backflow through either upper port 6 or lower inlet port 7 despite the greater fluid pressure at side outlet port 8. Although pressure differential serves to hold lower inlet port 7 closed in FIG. 3, it is to be understood that it is within the contemplation of the present invention to maintain both inlet ports 6 and 7 closed through a suitable sensing mechanism responsive to a preselected temperature or pressure in the fluid system or to a suitably set timer mechanism associated with the system; as is shown schematically by the control blocks 27, 28 and 29 respectively in FIGS. 4–6.

The invention claimed is:

1. A three-way fluid valve for a variable fluid system comprising:
    a housing member including a ported chamber having three spaced ports; two of which serve as first and second linearly aligned inlet ports and the third one of which serves as an outlet port;
    valve lid means adjacently cooperative with each of said first and second inlet ports to control fluid flow through each of said inlet ports; and,
    a single, sole control means for said valve lid means linearly aligned with both of said linearly aligned inlet ports to selectively jointly and separately control fluid flow from each of said first and second inlet ports through said outlet port, said control means being responsive to a preselected condition in said variable fluid system to insure closing of said first and second inlet ports when the preselected condition is reached.

2. The three-way fluid valve of claim 1, said control means including solenoid means and moveable armature means cooperative with one of said valve lid means to open one of said first and second inlet ports selectively.

3. The three-way fluid valve of claim 2, said solenoid means being remotely positioned outside said ported chamber to cooperate with a portion of said armature means connected to a portion thereof extending within said ported chamber.

4. The three-way fluid valve of claim 2, and spring means cooperative with said moveable armature means to yieldingly urge one of said valve lid means into "closed" position with one of said inlet ports when said other valve lid means is in "open" position with respect to the other of said inlet ports, said valve lid means of said first and second inlet ports being jointly moveable and separately movable relative each other.

5. The three-way fluid valve of claim 2, said first and second inlet ports being linearly aligned in spaced opposed relation with said moveable armature means including first and second linearly intermeshing armature parts to be relatively moveable with respect to each other to allow independent valve lid operation.

6. The three-way fluid valve of claim 2, said first and second inlet ports each tapering inwardly in a direction away from said ported chamber with said valve lid means compatibly tapering to nest therewith.

7. The three-way fluid valve of claim 2, said first and second inlet ports being linearly aligned in spaced opposed relation with said moveable armature means including first and second linearly interfitting armature parts relatively moveable with respect to each other to allow independent valve lid operation; and, spring means cooperative with one of said armature parts to yieldably urge one of said valve lid means into "closed" position with its adjacent inlet port when the other valve lid means is in "open" position with respect to its adjacent port.

8. The three-way fluid valve of claim 1, said control means being responsive to a preselected temperature in said fluid system to insure closing of both said first and second inlet ports.

9. The three-way fluid valve of claim 1, said control means being responsive to a timer mechanism in said fluid system to insure closing both said first and second inlet ports.

10. The three-way fluid valve of claim 1, said control means being responsive to a preselected pressure in said fluid system to insure closing of both said first and second inlet ports.

11. The three-way fluid valve of claim 10, said control means being so pressure responsive to insure closing of both said first and second inlet ports when the pressure in said outlet port exceeds either of the pressures in said first and second inlet ports.

12. A three-way fluid valve for a variable fluid system comprising: a housing member including a vertically extending ported chamber having three spaced ports, two ports of which are linearly and vertically aligned in spaced opposed relation at opposite ends of said vertically extending chamber to serve as first upper and second lower inlet ports with the third port extending horizontally from said chamber intermediate said spaced first and upper and second lower ports to serve as an outlet port;

first and second vertically aligned, lineally extending armature parts slidably disposed within said chamber, said first armature part including an integral upper valve lid positioned to nest with said first upper inlet port and having an integral actuating arm portion vertically and movably extending upwardly in said housing member outside said ported chamber and an integral nesting tail portion vertically extending downwardly within said chamber, said second armature part including an integral lower valve lid positioned at the lower extremity thereof to nest with said second lower inlet port and having a recess therein at the upper extremity thereof to nestingly receive said downwardly extending tail portion of said first armature part in slidable relation therewith so that said first and second armature parts within said ported chamber are in slidable, moveable relation with respect to each other to allow independent valve lid actions with respect to said relatively moveable first and second armature parts with said first and second opposed inlet ports each tapering inwardly in a direction away from said ported chamber and with said upper and lower valve lids compatibly tapering to nest respectively with said upper and lower opposed inlet ports; a coil spring disposed within said ported chamber in surrounding relation to said second armature part and engaging with said first armature part to yieldingly urge said first armature part and the valve lid integral therewith into "closed" position with said upper inlet port; and, a solenoid coil and plunger assembly with said coil surrounding said plunger of said assembly and with said plunger extending vertically to abuttingly engage the upper extremity of said integral actuating arm portion arm of said first armature part which extends upwardly in said housing member outside said ported chamber to move said first armature part and said first valve lid into "open" position against said yielding coil spring; and pressure responsive control means to insure closing of both said inlet ports when the pressure in said outlet port exceeds either of the pressures in said inlet ports.

* * * * *